United States Patent [19]

Mente

[11] Patent Number: 4,818,465

[45] Date of Patent: Apr. 4, 1989

[54] PROCESS FOR THE PRODUCTION OF SHAPED PLASTIC ELEMENTS

[75] Inventor: Kurt Mente, Hanover, Fed. Rep. of Germany

[73] Assignee: J. H. Benecke GmbH, Hanover, Fed. Rep. of Germany

[21] Appl. No.: 183,360

[22] Filed: Apr. 12, 1988

Related U.S. Application Data

[63] Continuation of Ser. No. 831,301, Feb. 20, 1986, abandoned.

[30] Foreign Application Priority Data

Feb. 20, 1985 [DE] Fed. Rep. of Germany ....... 3505828

[51] Int. Cl.$^4$ ............................................. B29C 51/10
[52] U.S. Cl. ..................................... 264/522; 264/554
[58] Field of Search ............... 264/522, 547, 553, 554; 425/384, 388

[56] References Cited

U.S. PATENT DOCUMENTS 2,365,637 12/1944 Helwig ................................. 264/547
2,468,697 4/1949 Wiley ................................... 264/547
2,647,284 8/1953 Richardson et al. ............... 264/522

Primary Examiner—Jan H. Silbaugh
Assistant Examiner—Jill L. Heitbrink
Attorney, Agent, or Firm—Cushman, Darby & Cushman

[57] ABSTRACT

A deep drawing molding process for the formation of shaped plastic elements in which a certain thickness of the thermoplastic sheet to be formed is heated to the plastic flow state while an embossed or decorated outer side of the sheet is maintained at a temperature below the plastic state by means of a cooling air stream. The plastic element producted has an undamaged decorated side and improved wear properties such that it may be used in high ambient temperature applications, such as automobile dashboards, without cracking. The apparatus for heating and forming the plastic element includes a clamping frame to hold the sheet, a heating element disposed above the sheet, a molding box below the frame, which box is provided with inlets and outlets for cooling air and the application of vacuum, and a moldign tool also disposed above said frame, which is forced through said frame and against said sheet when a certain thickness of the sheet has been heated to the desired plastic flow temperature.

9 Claims, 4 Drawing Sheets

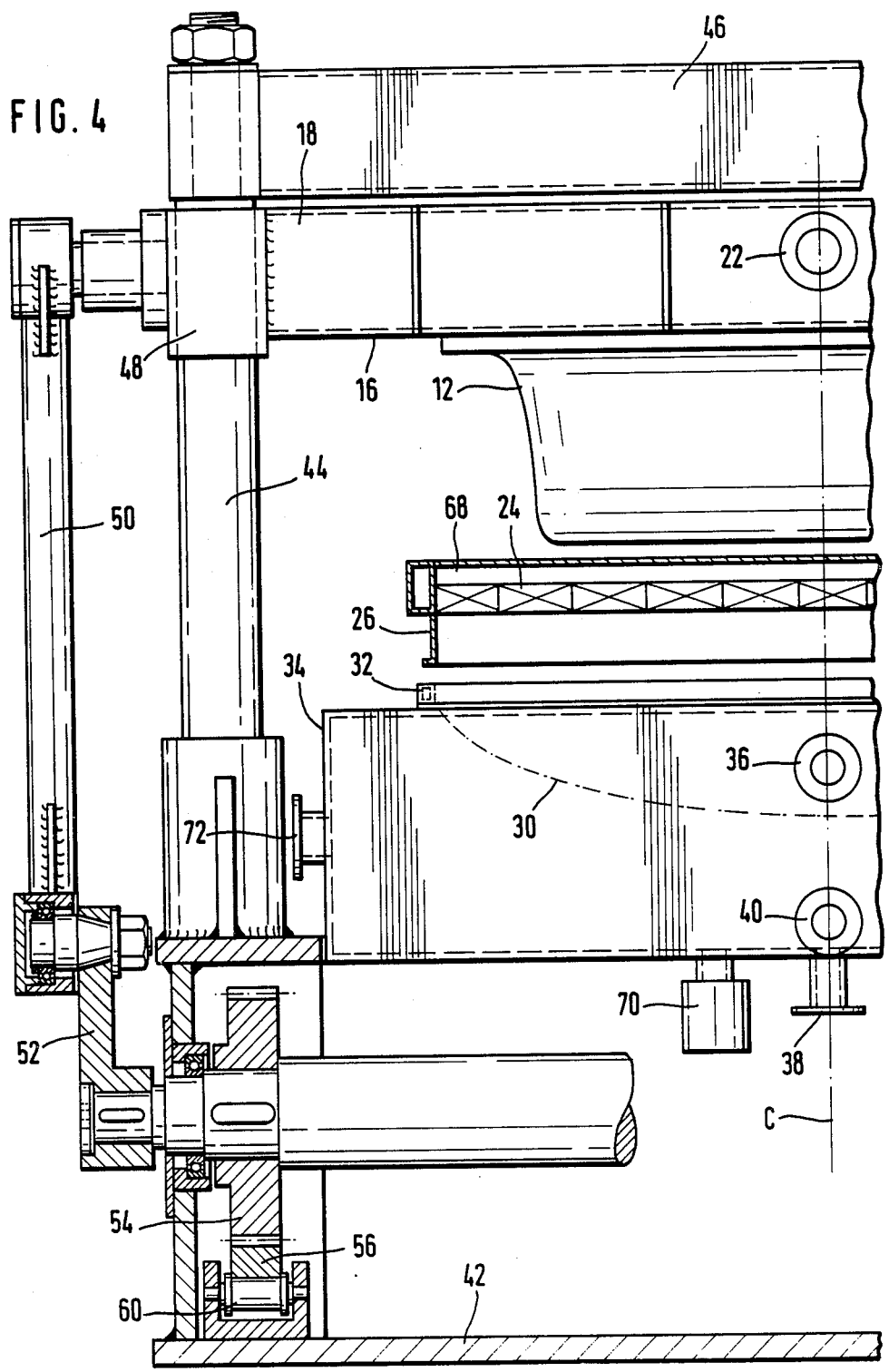

PROCESS FOR THE PRODUCTION OF SHAPED PLASTIC ELEMENTS

This is a continuation of application Ser. No. 831,301, filed Feb. 20, 1986, which was abandoned upon the filing hereof.

This invention relates to a process for the production of shaped plastic sheets or films, particularly those having an embossed or textured decorative surface, by the application of heat and vacuum during molding. The invention also deals with an apparatus to carry out the process. More specifically, the invention provides a process for molding and shaping thermoplastic sheets or film surfaces wherein a temperature gradient is established across the thickness of the plastic sheet such that a certain thickness is heated to the plastic state while an exterior surface of the same component is supported and cooled to a temperature below the plastic state by a stream of air.

It is well known to provide decorative molded panel surfaces for various consumer products formed of an outer surface of a synthetic thermoplastic sheet, frequently bonded on its backside with another material, e.g. a polyurethane foam. The desirability of such materials is to have an attractive surface having a degree of flexibility and softness, hence the use of a thermoplastic resin, with a suitable decorative surface effect such as are made by embossing or other graining technique, and adapted to receive backing material, if desired, either for cushioning or strengthening purposes. The thermoplastic resin surface sheet is normally formed of a thermoplastic resin such as polyvinylchloride which is essentially dimensionally stable at temperatures which will normally be encountered in the environment in which it is used. However, in use such thermoplastic resins may be exposed from time to time and over long periods of time to exceptionally high ambient temperatures which can lead to a deterioration of the appearance of the panel. This is commonly encountered in one important application of this invention, i.e. in the formation of instrument panels or door and head liners and arm rests for automobiles.

The thermoplastic resin materials typically used for such panels generally have a deforming temperature range of about 150°-180° C., but when formed in this temperature range "memory" of the previous shape is retained. On the other hand, if deformed at a higher temperature, e.g., 240°-280° C., i.e., in "plastic flow" temperature range, the "memory" is lost (even re-set to the new shape). However, at that temperature range, flow of the material will occur, and a decorated, e.g., embossed surface will lose its desired appearance.

It is a characteristic in the making of such products that the thermoplastic resin sheet must be deformed in a mold and the deformation-molding step necessarily involves a certain stretching of at least portions of the pre-formed, embossed for instance, thermoplastic sheet member. This process has the effect of stressing by elongation and temporarily reorienting the polymer molecules of the sheet. While at normal ambient temperatures such a stressed deformed thermoplastic resin sheet will substantially retain its shape, at more elevated temperatures (such as occur in hot sunny days in the interior of an automobile), temperatures can rise to a point where a degree of molecule freedom is set in, and strong molecular forces then come into play, which stress the tensioned portions of the panel which have been deformed. The result is the common observation of a splitting of the surface of such panel when the stress imposed by the "memory" of the thermoplastic material exceeds the tensile strength of the material.

These forces could be overcome by molding the entire plastic sheet at temperature in the range of the "plastic flow" temperature of the thermoplastic resin, but if this is done, the embossed or other decorative surface which has been developed on the plastic sheet would be destroyed or blemished, and at least adversely affected.

Accordingly, there is a need for a process, and for an apparatus to practice the process, whereby the required deformation can take place in such a manner that subsequent stresses induced by abnormally high temperatures in use of the ultimate article are overcome by relieving the stresses within the sheet material itself. Having in mind that these decorative sheet materials are of a rather small thickness dimension, e.g., only one or two millimeters in typical practice, this requirement imposes a severe problem in the industry.

Accordingly, this invention provides a technique whereby at least a substantial portion of the thickness of the sheet material to be formed is brought to a temperature in the range of the "plastic flow" non-recovery temperature of the thermoplastic resin involved, while at the same time maintaining the exterior decorated surfaces of such sheet material at a temperature well below such "plastic flow" temperature. By this means, the backside of the sheet material, which has been raised to the "plastic flow" temperature range will be free from the "memory" stresses. Even though the exterior surface will have such stresses, the integral backside of the sheet material will, after such molding process, exhibit sufficient tensile strength to preserve the integrity of the entire sheet without splitting or ripping caused by subsequent thermnal stresses on exposure of the finished article to high temperatures.

Known processes for vacuum forming thermoplastic sheets are described in, e.g. "Modern Plastics Encyclopedia", 1969-1970, pp. 534-563 and in the German OS No. 3 130 584 in an exhaustive manner. Accordingly, one can differentiate between lower temperature known positive and negative processes, in which processes the thermoplastic sheet, even in extreme cases, is generally not heated above about 182° C. In these processes the influence of conditions of the procedures with regard to a possible impairment of the decorated exterior side of the sheet is not mentioned.

A positive process has also been described in the German patent No. 25 08 982. In this process it is important that the preparation temperature is as near as possible to just below the deep-drawing temperature of the thermoplastic, but is still sufficiently low that the sheet of material, held at its lateral edges, is strong enough to sustain its own weight over prolonged times, without flowing. Accordingly, the useful deep-drawing temperature in such process, depending on the nature and thickness of the sheet, will reside in the region of above 140° C., but not higher than 170° C. For purposes of molding processes of this type, the deep drawing temperature is the temperature at which the mold apparatus is inserted into the preheated material to be molded.

As noted above a disadvantage of this positive process is the fact that the deep-drawn sheet has to be shaped in the elastic-plastic transition temperature area of about 140°-170° C. The thermoplastic polymer molecules in the morphology of the sheet which are stretched or deformed in this temperature area will, after reheating, attempt to resume their original orientation and whenever they are impeded from doing so, considerable shrinking forces will be developed.

In addition to the so-called positive-process, the negative-process is also frequently used. In this process, the thermoplastic sheet is sucked into a concave form by means of a vacuum. However, since the deformation temperatures will again lie in the elastic-plastic transition area, the same disadvantages occur as in the case of the positive-process.

The present invention has as its object an improvement in the aforementioned positive processes in such a way, that the deformation and molding of the deep-drawable sheet, over a considerable percentage of its thickness, will take place in the plastic recovery-free temperature range, while the exterior decorated surface thereof will remain below that temperature to avoid plastic flow and possible damage thereto. A molded sheet thus formed may, for example, be used as an instrument panel for a motor vehicle which will be suitable even under extreme climatic conditions.

To achieve this object, the process of the present invention applies to the back side of a deformed deep-drawable sheet of thermoplastic resin, for example polyvinylchloride, prior to the final deformation in the mold, high intensity radiation to raise the temperature thereof to within the plastic temperature range, over a zone of thickness of the sheet which is less than the total thickness.

To avoid thermal damage, the embossed or decorative side of the deep-drawable sheet must not, however, be heated above about 170° C., whereas the plastic, reversal-free temperature range only starts at 180° C. Nonetheless the back side of the sheet must be heated to as high a temperature as possible in order to heat as great a portion of the total thickness of the sheet as possible into the plastic recovery-free state. At least 30% of the thickness of the sheet is heated in this manner in the present molding process. The border line of the thermal load carrying capacity of the back side of the sheet will generally lie at a upper temperature of 240° C., which may be endured only for a few seconds without damage to the entire structure.

In the plastic state the sheet has only limited strength. In order to avoid sag of the sheet during the heating process, the sheet is fixed, e.g. clamped, in a frame and is subjected to a supporting stream of air from below. The supporting air stream also has the function of cooling the exterior side of the sheet to maintain its temperature level below 170° C., so that a steep temperature gradient across the thickness of the sheet is established and thus an even greater proportion of the sheet thickness may be heated to the plastic state temperatures. Depending on the thickness of the sheet, where polyvinylchloride thermoplastic resin is used, a heating period of 5 to 45 seconds is used to bring the reverse side of the sheet to the molding temperature of 240° C.

Since the steep temperature gradient may nonetheless result in damage to the appearance and structure of the outer decorated side of the sheet is maintained for too long a period of time, it is of great importance that the final mold-forming process takes place as rapidly as possible, preferably in less than 5 seconds.

The concept of this invention may also be applied to the negative-process described above. For this purpose, an inside engraved negative tool is disposed in place of the molding or suction box of the positive process, which is supplied with a high vacuum for the deformation and simultaneous embossing of the sheets. For this purpose the deep drawable sheets have smooth surfaces, and the decorated side thereof is provided with a flat finish for finishing.

The apparatus of the present invention for carrying out the molding process includes a molding box open on top, a sheet-holding arrangement that may be positioned in the open area of the molding box, a heating source placed above the box, as well as an upper convex molding tool provided with suction openings.

The molding box is made so as to be pressure resistant and has connections for the introduction of a supporting air stream as well as a connection for the formation of a vacuum inside the molding box.

The holding arrangement consists of a clamping frame, capable of being opened, which is laterally moveable by means of a chain drive.

The heating source is made up of an infrared radiator, which is likewise moveable in lateral guides by means of a crank drive.

For an effective operation, a revolving highly polished aluminum screen for the infrared radiator is provided.

Viewed all together the inventive apparatus comprises a lower mounting with two lateral guides, which are held above by a transverse bar. Guide-bodies are assigned to the guides, which are movable perpendicularly along the guides, and which are connected with a tool carrier for the molding tool and with a connecting rod of a crank drive.

The crank drive comprises a toothed rod engaging with a gear, as well as a hydraulic cylinder connected with the toothed rod.

The crank drive with the connecting rods is arranged such that the perpendicular movement and force extended by the tool carrier or of the molding tool connected therewith takes place in the pattern of a sine-wave. By that means the molding tool reaches the deforming position with a slow delay (softly).

Additional advantages of the device will be seen from the following description and the drawings.

BRIEF DESCRIPTION OF THE DRAWINGS

FIG. 4 shows a side view of the apparatus of FIG. 3, illustrating only the one left half.

DETAILED DESCRIPTION OF THE DRAWINGS

Figure 1:
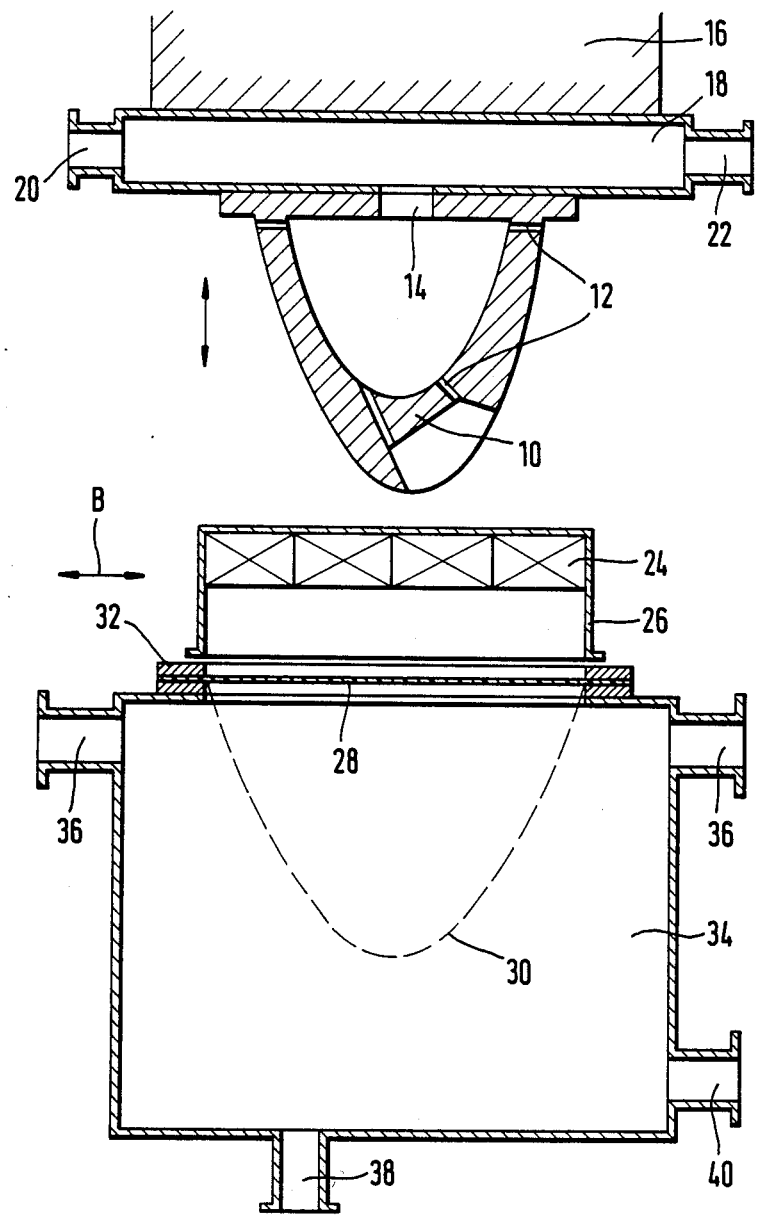
FIG. 1 shows a schematic cross sectional view of an apparatus for producing a shaped plastic element.

Referring to FIG. 1, the device shown comprises a molding tool 10, with several suction openings 12 and 14. Molding tool 10 is attached to a tool carrier 16 which is perpendicularly movable by way of a crank drive 52, shown in more detail in FIGS. 3 and 4.

Tool carrier 16 for the movement of molding tool 10 is constructed as a box carrier stiffened with ribs, hollow space 18 of which may be connected to a high vacuum line not shown here in detail.

Hollow space 18 furthermore ends in another connection 22 with a magnetic valve, not shown, which, after the deformation process, makes possible a pressure equalization with the environmental air pressure.

Below molding tool 10 an infrared radiator 24 is provided as a heating source with a lateral screen 26. As indicated by the double arrow B, infrared radiator 24 is horizontally moveable.

A clamping frame 32, in which thermoplastic sheet 28 is clamped on all edges is also provided. Clamping frame 32 is located above a molding box 34, which is open on top, and clamping frame 32 is likewise laterally movable.

Molding box 34 is open and in upward direction, and has connections 36 and 38 for the introduction of the supporting air stream as well as an additional connection 40, by means of which a vacuum may be produced within molding box 34.

In order to heat plastic sheet 28, clamped in the clamping frame 32, infrared radiator 24 is moved from the direction of the side into the device and into the position shown. At the same time, a supporting air stream is blown in through connections 36 into the molding box, and the supporting air stream may exit the box by way of opening 38 out into the open air. The speed of the exiting air stream may be used as a measure of the excess pressure developed in molding box 34, and supports sheet 28 during the heating process.

Sheet 28 is clamped down within clamping frame 32 in such a way that the decorated or embossed exterior side faces away from infrared radiator 24. Thus the back side only of the sheet is directly heated by infrared radiator 24. After achieving the desird deformation temperature of approximately 240° C., connections 36 and 38 are closed by way of valves, not shown here in detail, and at the same time sheet 28 is initially deformed and assumes the position schematically characterized by the broken line 30. Where a polyvinylchloride sheet is used, heating of the reverse side takes place in 5 to 45 seconds. Generally, at least 30% of the thickness of the sheet will be heated to the plastic temperature in this manner.

At this point infrared radiator 24 is moved into a waiting position outside of the deep-draw device, and tool carrier 16 is moved, with molding tool 10, into molding box 34. At this moment a high vacuum is applied to the molding tool 10 by way of connection 20, while the other connection 22 remains closed.

At the same time connection 40 is also closed and connection 38 is opened, so that in molding box 34 the air pressure of the ambient air presses sheet 28 to conform to the contours of molding tool 10. After a cooling down time of about 30 seconds, connection 20 is closed and connection 22 is opened, so that the ambient air pressure appears again in molding tool 10. Molding tool 10 is again moved upwards outside of molding box 34 into the position shown in FIG. 1, and the completely-shaped deep-drawn sheet may now be removed from clamping frame 32.

Figure 2:
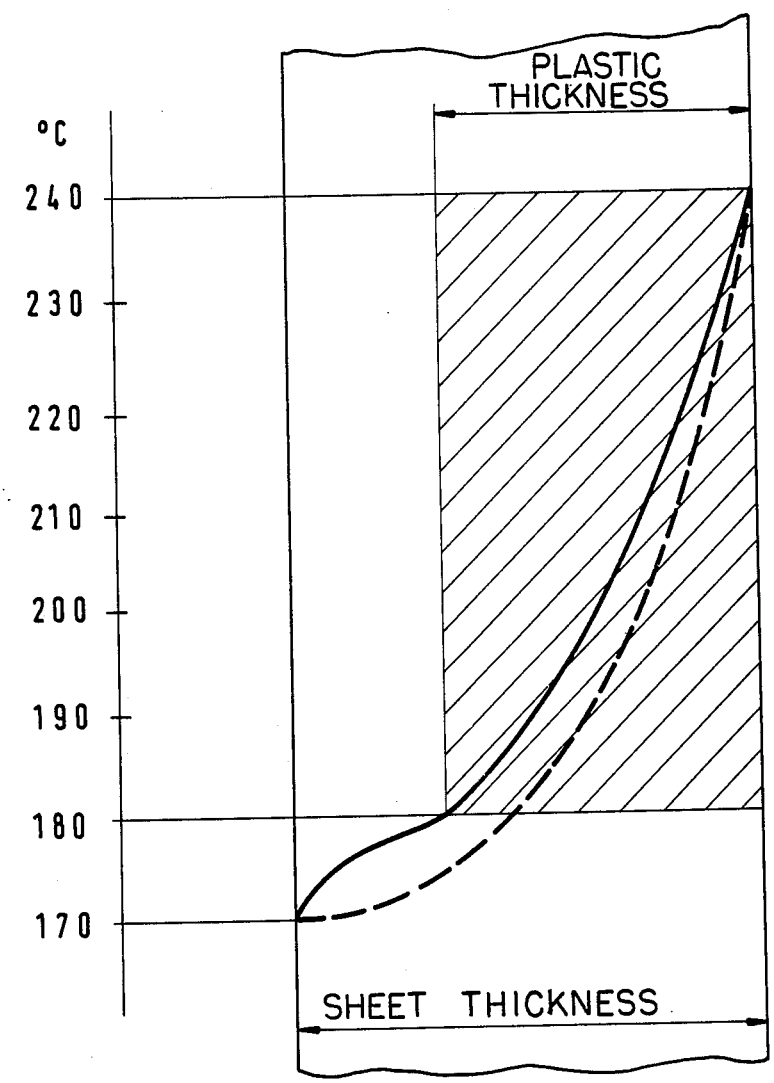
FIG. 2 schematically illustrates the temperature gradient over the thickness of the sheet taken after completion of the heating up process under the effect of the cooling support air (solid line) and without the supporting air (broken line).

For a better understanding of the steps in the process, described so far in principle, and of the sheet deforming operation, the schematic temperature gradient over the thickness of the foil after completion of the heating-up process by infrared radiator 24 is shown in FIG. 2. The solid line shows the gradient of the temperature under the effect of the cooling supporting air, while the broken line reproduces the gradient of the temperature without supporting air.

Figure 3:
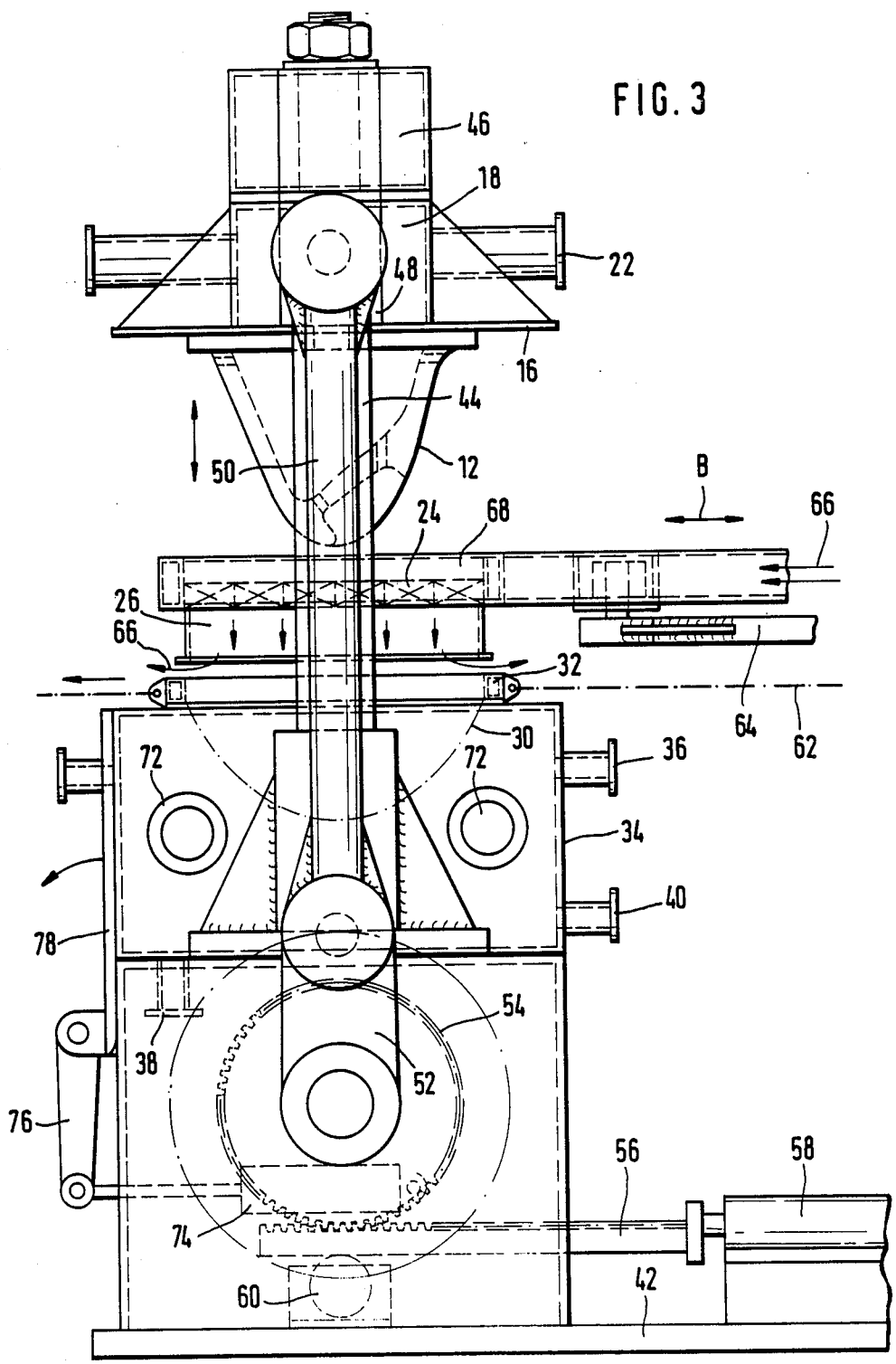
FIG. 3 shows in detailed presentation a front view of a prototype of an apparatus.

FIGS. 3 and 4 illustrate in more detail the construction of a device for carrying out the process of the invention. At the same time and for the sake of simplification only the left half of the machine, up to the center line C, is shown in side view of FIG. 4.

The apparatus comprises a base 42, on which two guides 44 are disposed laterally which are held in their upper part by a transverse support 46.

Guide 44 is provided with a perpendicularly movable guiding member 48, which is connected on the one hand to the top with molding tool 10 and on the other hand to a connecting rod 50. Guide body 48 fulfills two functions, namely providing for a perpendicular movement of tool carrier 16 and also the accommodation of the connecting rod bearing for connecting rod 50. Connecting rods 50 are components of crank drive 52, which comprises a gear 54, a toothed rod 56, supported by roll 60, as well as a hydraulic cylinder 58.

Crank drive 52 is moved by means of hydraulic cylinder 58, by gear 54 and by means of toothed rod 56. At the same time the hydraulic cylinder 58 is acted upon by a constant, adjustable quantity of hydraluic fluid which imparts a constant speed to the piston of the hydraulic cylinder.

In this manner shaping tool 10 is lowered in a sine-wave shaped manner, i.e., so as to "softly" reach the deformation position in the lower dead center of crank drive 52 in molding box 34, in order to avoid that sheet 28 could tear from too high a deformation speed.

To begin the operation, the pre-cut deep drawable sheet 28 to be deformed is first inserted in clamping frame 32, and clamped on all edges and is then moved by means of a chain drive 62 to the deformation station above molding box 34, open on top.

At the same time the infrared radiator 24 is turned on and likewise moved by way of a crank drive 64 with lateral guides into the deformation station shown. Only the connecting rod of the crank drive 64 is illustrated in FIG. 3.

The frame of infrared radiator 24 has a rectangular hollow profile into which air, indicated by the arrows 66, is blown by means of a ventilator and by means of a flexible air conduit, not shown. Air stream 66 passes through the pressure chamber 68 above infrared radiator 24 and flows through the base of the pressure chamber, through holes of about 1.5 mm diameter, which are arranged in a row between the infrared radiation elements. Then air stream 66 exits to the open air through the intervals of the individual infrared radiation elements of infrared radiator 24 between screening 26 and clamping frame 32.

The volume of air stream 66 is such that any (softener) vapors emitted from the thermoplastic sheet 28 during heating are kept away from the infrared radiation elements of infrared radiator 24 and so that the radiation intensities of the latter are not significantly impaired.

Screening 26 consists of highly polished aluminum sheet and, in addition, it has the task of reflecting the lateral radiation of infrared radiator 24 onto sheet 28, also in order to heat the marginal zone of sheet 28.

An infrared thermometer 70 is provided for measuring the required deformation temperature. After reaching the deformation temperature, as measured with infrared thermometer 70, connections 36 and 38 of molding box 34 are closed, and a vacuum is applied by way of connection 40, and to such a degree that the sheet 28 is pre-shaped to about ⅓ to ½ of the height of the tool.

At this point infrared radiator 24 is turned off and is moved by means of a crank drive 64 into a waiting position outside the device. Practically at the same time crank drive 52 is now operated in order to move molding tool 10 suddenly into the lower dead center of the crank drive or into the final deformation position.

After the deformation, which as has already been described must take place as quickly as possible, cooling air is blown in via connections 72 over the front side of molding box 34. For a quick cooling down, water may also be added to the cooling air by way of spray nozzles. In extreme cases, it is also possible to cool the molding tool 10 with water by way of built-in coils of pipe.

After a cooling down time of about 15 to 30 seconds—depending on the thickness of the thermoplastic sheet—a flap 78, operable by means of a pneumatic cylinder 74 and of a lever 76, opens at an angle of 90°. Now chain drive 62 is put in operation, which transports the now completely deformed or shaped sheet part, suspended in clamping frame 32 in the direction of the arrow A to the next operating station.

In connection with FIG. 4 it is again pointed out that for reasons of simplification only the one half of the device has been shown. With the exception of toothed rod 56 and the parts connected therewith, the right half thereof will essentially correspond, taking the center line C as a line of symmetry.

In a specific illustrative embodiment, the molding tool is made of aluminum being 350 mm high, 400 mm in width and 1330 mm in length.

The thermoplastic sheet in the clamping frame 32 is 1550 by 550 mm, and of a thickness of 1 mm. The maximum degree of deforming, $V_{max}$, is about 4 where V is defined as being $$V = RV_{longitudinal} \times RV_{vertical}$$

whereby $RV = L_x/L_o$ namely the linear stretching ratio of the stretched length $L_x$ in relation to the original length $L_o$.

The remaining thickness of the sheet at the thinnest area is 0.25 mm.

The infrared irradiation system 24 can be partially adjusted to the desired heating energy. The maximum heat is 60kW/m². The short wave heating has a radiation maximum between 0.9 and 1.6 μm. The period for heating to the necessary temperature is about 12 seconds.

The temperature profile of the sheet is: at the embossed or decorated side, 170° C.; the backside of the sheet has a temperature of 210° C. to 230° C., according to the desired degree of deformation.

For reasons of appearance, and to maintain the exterior decorative structure, those parts of the sheet which cannot be seen by the user, e.g. if the sheet is used for an instrument panel in a motor car, are heated at the backside at a higher temperature which means they are more deformed while those parts of the sheet which are ultimately visible in use are subject to less heat and less deformation.

The velocity of the supporting air at opening 38 of molding box 34 is about 4 m/sec.

The vacuum in box 34 is adjusted to such a value that the sheet sags for about ½ to ⅔ of the height of the tool. The vacuum at the end of the deformation step is 0.2 bar.

The formed sheets are attached to a support whereby the space between the sheet and support may be filled with a soft polyurethane foam to form a composite panel. A subsequent shrinking of the final panel in the motor car e.g. under the influence of the sun will not then lead to subsequent deformation or destruction of the panel. The maximum shrinking energy $E_{max}$ should be 0.5 cm. This is determined by taking a stretched sample of the sheet having a length (L) of 12 cm and a width (b) of 2 cm and a thickness (d). This sample is clamped with two clamps at a distance of $L_o = 10$ cm. Different weights are attached at the lower end of the sheet sample which is stored in a heating chamber having a temperature of 110° C.

The total weight of the clamp and the additional weight give the tension $$\sigma = G/b \cdot d \ N/cm^2$$

The sheet sample then shrinks against this tension by increased warming to a corresponding end value, so that the shrinking value is ΔL. The energy is $E = G \cdot \Delta L$ N-cm. If energy E and tension sigma are plotted on a graph, then the maximum shrinking energy can be seen from the curve.

SUMMARY

A deep drawing process is described for the production of shaped plastic elements, such as in situ moldable motor vehicle liners, dashboards, arm rests, and the like on other items of similar nature, made of deep-drawable synthetic thermoplastic sheets. The sheet is held by a clamping frame and heated to the warm pre-shaping temperature and is bent in a preforming manner to a general contour, corresponding to the shaping tool, whereupon the shaping tool is moved into the curvature of the then preformed sheet and the sheet finally deformed by production of a pressure difference between the sheet and the surface of the shaping tool on said tool, and after cooling off is removed from said tool. At the same time and prior to final deforming, a zone of the thickness of the sheet on its reverse or back side is brought to the plastic temperature range of the synthetic substance employed by heating by means of high radiation intensity.

Furthermore, an apparatus for carrying out of the process has been described, which comprises a molding box open on top, a changing frame positionable in the open area of the molding box and a laterally movable heating source disposed above it. A further component of the apparatus is a shaping tool disposed above, which may be moved by means of a crank drive, softly into the deformation position.

What is claimed is:

1. A vacuum deep-drawing process for the production of a shaped thermoplastic article from a deep-drawable thermoplastic sheet comprising the steps of:
   clamping said sheet in a clamping frame in a combined heating and cooling unit;
   heating a first side and at least 30% of the thickness of the thermoplastic sheet to within the plastic flow temperature range thereof;
   simultaneously cooling a second side of the thermoplastic sheet to a temperature less than the plastic flow temperature range thereof;
   deep-drawing said thermoplastic sheet by applying a molding tool against the first side of the sheet; and
   applying a vacuum to said first side of said sheet so as to draw said first side against said molding tool.

2. Process as claimed in claim 1 wherein said deep-drawable thermoplastic sheet is polyvinylchloride, and wherein the first side of the sheet is heated to from 180°–240° C., and the second side of the sheet is cooled to less than 170° C.

3. Process as in claim 1 wherein the heating of said first side, depending on the thickness of the sheet, takes place in from 5 to 45 seconds.

4. Process as in claim 1 wherein said second side is cooled to a temperature of less than 170° C.

5. Process as in claim 1 wherein said deep-drawing takes place while substantially retaining the temperature difference between the first and second sides of said sheet.

6. Process for the manufacture of a shaped article from a deep-drawable thermoplastic sheet wherein the sheet is held horizontally by a clamping frame in a combined heating and cooling unit and wherein, prior to forming, a first side and at least 30% of the thickness of the sheet is heated with an infrared radiator from above to within the plastic flow temperature range thereof, and a second embossed side of said sheet is, at the same time, cooled and supported by an air stream to a temperature less than the plastic flow temperature range thereof, resulting in a temperature gradient across the thickness of the sheet, and deep-drawing said thermoplastic sheet by applying a molding tool against the first side of the sheet.

7. Process as in claim 6 wherein said sheet is a polyvinylchloride sheet and more than 30% of the thickness is heated to the plastic flow temperature of 180° C.

8. Process as in claim 6 wherein the cooling air steam keeps the temperature of the second side of the sheet under the temperature of 170° C.

9. Process as in claim 6 wherein said sheet is a polyvinylchloride sheet and the portion of the first side nearest the radiator is heated to the plastic flow temperature of 240° C.

* * * * *